A. H. PEYCKE.
BRAKE RIGGING.
APPLICATION FILED APR. 22, 1918.
1,339,415. Patented May 11, 1920.
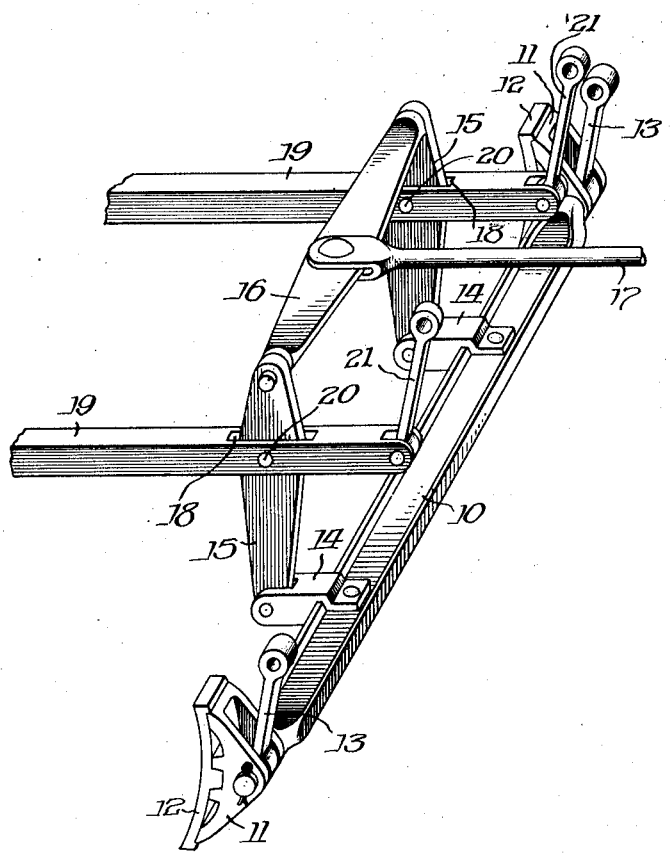

UNITED STATES PATENT OFFICE.

ARMAND H. PEYCKE, OF CHICAGO, ILLINOIS, ASSIGNOR TO AMERICAN STEEL FOUNDRIES, OF CHICAGO, ILLINOIS, A CORPORATION OF NEW JERSEY.

BRAKE-RIGGING.

1,339,415.

Specification of Letters Patent.

Patented May 11, 1920.

Application filed April 22, 1918. Serial No. 229,933.

*To all whom it may concern:*

Be it known that I, ARMAND H. PEYCKE, a citizen of the United States, and resident of Chicago, in the county of Cook and State of Illinois, have invented certain new and useful Improvements in Brake-Rigging, of which the following is a specification.

This invention relates to brake rigging.

One of the objects of the invention is to simplify and improve brake rigging and means for supporting the same.

Another object is to provide and improve brake rigging supported in a novel manner and arranged to meet the requirements for successful operation.

The invention is illustrated on the accompanying sheet of drawings in which the single figure is a fragmentary perspective view of brake rigging embodying my invention.

This brake rigging is of the clasp brake type, in which associated brakes are arranged on opposite sides of each pair of wheels. One end of the brake rigging is shown in the single figure of the drawing.

Upon opposite ends of a brake beam 10, brake heads 11 are mounted, said brake heads carrying brake shoes 12 for engaging braking surfaces of coöperating truck wheels, not shown.

A brake hanger 13 is pivotally connected to each of the heads and to the beam 10 for supporting the brake beam and heads, it being understood that the upper ends of said hangers 13 are pivotally connected to any suitable support. The brake beam 10 is provided with fulcrums 14, to the outer end of each of which is pivotally connected a brake or truck lever 15, the upper ends of said truck levers being connected by an equalizing bar 16, which extends between said levers 15. A body pull rod 17 is connected to an intermediate portion of the equalizer bar for transmitting braking movements through the levers and beam to the brake heads. Each of the brake levers 15 extends through an opening 18 in its corresponding operating or pull rods, 19, said levers 15 being pivotally connected at 20 to said pull rods. In order to support the pull rods and to assist in supporting the remaining portions of the brake mechanism, the outer ends of the intermediate pull rods 19, have pivotally connected thereto, supporting hangers 21, the upper ends of which, it will be understood, are connected to any suitable support.

By means of this arrangement the brake rigging is supported in a simple and improved manner, and at the same time the equalizer arrangement is simplified and improved.

It is my intention to cover modifications of this invention falling within the spirit and scope of the following claims.

I claim:

1. In brake mechanism, the combination of a brake head, a brake hanger therefor, a brake lever operatively connected to said brake head, an equalizer bar directly connected to said brake lever, a pull rod associated with said brake lever, and a hanger connected to the pull rod for supporting the latter.

2. In brake mechanism, the combination of a brake beam, brake heads mounted thereon, brake hangers operatively connected to said beam and heads, fulcrums connected to said beam, brake levers connected to said fulcrums, pull rods respectively connected to said levers, hanger means for said pull rods, and an equalizer bar directly connecting said levers.

Signed at Chicago, Illinois, this 11th day of April, 1918.

ARMAND H. PEYCKE.

Witnesses:
CHAS. L. BYRON,
C. M. OBERBECK.